UNITED STATES PATENT OFFICE.

HENRY LEE NORRIS, OF NEW YORK, N. Y., ASSIGNOR TO S. T. ARMSTRONG.

IMPROVEMENT IN PRESERVING INDIA-RUBBER IN THE LIQUID STATE.

Specification forming part of Letters Patent No. 9,891, dated July 26, 1853.

*To all whom it may concern:*

Be it known that I, HENRY LEE NORRIS, of the city, county, and State of New York, have discovered and invented a new and useful Composition of Matter, and a new and useful manufacture; and I do hereby declare the following to be a full and exact description thereof.

The nature of my invention consists in treating the milk or juice drawn from the caoutchouc or india-rubber tree, so as to form a compound which remains liquid, and is prevented from fermentation, acidulation, coagulation, or becoming putrid, and which can therefore be transported to remote places without decomposition or deterioration, and also in so treating this composition as to produce therefrom a new and useful article of manufacture.

To enable others to use my said invention, I will now proceed to describe the manner of compounding my composition and producing my said new article of manufacture.

The milk or juice from the caoutchouc or india-rubber tree is collected by tapping the trees and allowing it to flow into vessels of clay or other material. Then and before the milk or juice is soured—say within three hours after it is drawn from the tree—it should be strained through a clean cloth or other strainer into a clean vessel—say of tin or glass. This being done I add to the milk or juice the concentrated liquor of ammonia, or ammonia in any other form, or its equivalents which will produce a like result; but I prefer the concentrated liquor of ammonia, as I have found that by experience to be the best.

The proportions may be varied, but those which from experience I have found to be the best, are to every pound of the milk or juice add one fluid ounce of the concentrated liquor of ammonia. I then agitate the composition so as to thoroughly mix the ingredients together. The composition so formed will be in a liquid state, remaining as white as when drawn from the trees. It can then be put up in air-tight vessels for transportation or future use, and for this purpose I prefer tin cans or glass bottles, as being of a cheap material and convenient form. The composition so made and inclosed may be transported to any part of the world and still remain in a state of preservation; and although I have spent about ten years in experimenting to invent or discover some means of compounding and preserving in a liquid state the milk or juice from the caoutchouc or india-rubber tree, or to make a composition with it which could be preserved so as to be transported to remote places without deterioration, and which experiments have involved the use of various kinds of air-tight vessels, and the mechanical admixture with the milk or juice of various substances, yet I was never able to succeed prior to my making the discovery and invention as above described; and this desideratum in the treatment of the milk or juice of the india-rubber tree has never been heretofore attained to my knowledge, and this my invention and discovery so far as I am informed is the first successful attempt in treating the milk or juice of the india-rubber tree so that it can be transported to any desirable distance in its liquid state, and of a pure white color suitable for manufacturing purposes, and in many respects superior for those purposes to the smoked or ordinary india-rubber of commerce.

To produce a new article of manufacture from this composition differing in its constituents from all other compounds of india-rubber heretofore in use, I pour or run this composition on plates of glass or polished metal or glazed paper or other suitable surface of any desired form, and subject it to the process of slow evaporation, which may be done in the common atmosphere or in an atmosphere of a temperature of, say, from 75° to 100° of Fahrenheit, and having thus evaporated the liquid part of the composition, the part remaining will be found to be a new article differing from the ordinary caoutchouc of commerce that is combined with creosote oil and carbon, a very different compound from mine, which is very elastic and tough and considerably transparent, and different in its properties from the ordinary caoutchouc of commerce or any other substance which I ever knew or heard of prior to my said discovery and invention, and which is of great value and utility, and which may be used as the material for and employed in a large variety of articles of usefulness, embracing those for which previously known compounds of india-rubber are used and many more.

Having now described my discovery and invention, and the manner of exercising, pro- ducing, and using the same, I desire to be understood what I claim as my invention, and for which I desire to secure Letters Patent, is—

1. The compound consisting of the native juice of the caoutchouc with aqua-ammonia, or the equivalent thereof, substantially as herein set forth, when said ammonia or its equivalent is mixed with said juice of the caoutchouc in a liquid state, by means of which the juice above named is preserved for a great length of time, and can be manufactured at less expense than the india-rubber of commerce, which is mixed with other foreign substances.

2. The solid elastic article when manufactured from the said composition of matter, as above described.

New York, February 10, 1853.

HENRY LEE NORRIS.

Witnesses:
   S. T. ARMSTRONG,
   T. W. ARMSTRONG.